United States Patent Office 3,535,353
Patented Oct. 20, 1970

3,535,353
DERIVATIVES OF CERTAIN POLYAMINE COMPOUNDS AND CARBOXYLIC ACIDS
Marwan R. Kamal, John R. Nazy, and Harold A. Wittcoff, Minneapolis, Minn., assignors to General Mills, Inc., a corporation of Delaware
No Drawing. Filed Oct. 24, 1966, Ser. No. 588,772
Int. Cl. C07c *103/30*
U.S. Cl. 260—404.5        5 Claims

ABSTRACT OF THE DISCLOSURE

New compositions of matter are prepared by reacting a polyamine having at least one free secondary amine group and at least two ketimine blocked primary amine groups with a carboxylic acid compound in substantially equivalent amounts to form an amide linkage or linkages from the secondary amine group or groups and the carboxyl group or groups of the carboxylic acid compound. Polymers are prepared by reacting the resulting derivatives with an organic polyisocyanate or polyisothiocyanate in the presence of water.

---

The present invention relates to derivatives of certain polyamine compounds and carboxylic acids. More particularly, it relates to derivatives of carboxylic acids (or the anhydrides, acid halides or esters thereof) and certain polyamine compounds in which the primary amine groups are blocked by ketimine groups. It also relates to the preparation of polymers from such derivatives and organic polyisocyanates or polyisothiocyanates.

It has previously been proposed to prepare polyureas from compositions comprising polyisocyanates and polyamines wherein the primary amine groups are blocked by ketimine groups. Such compositions were found to be relatively stable in the absence of moisture. Finally cured or foamed polyurea products are prepared therefrom by simple exposure to moisture which converts the blocked polyamine compound to the free polyamine which is then capable of reacting with the polyisocyanate to form the polyurea polymer. Such one-component systems were found to be very useful. Thus in using said compositions, it is possible to cast a film of the mixture and expose it to moisture from the atmosphere to form a polyurea coating which becomes tack-free in a relatively short period of time. It is also possible to form thicker castings of the said compositions and, upon exposure to moisture, curing likewise takes place. Such systems may also be used for the preparation of room temperature curing caulking compounds, sealants and adhesives.

While the use of the ketimine blocked polyamines allows a reasonable degree of control over the polyamine-polyisocyanate reaction, the properties of the resulting polyurea polymers are not always completely satisfactory for any particular use. The properties are dependent mainly on the particular polyamine and polyisocyanate employed. It would be desirable to be able to have control over the polyamine-polyisocyanate reaction and yet be able to tailor the properties of the resulting polyurea polymers.

It is, therefore, an object of the present invention to provide novel derivatives of certain polyamine compounds and carboxylic acids. Another object of the invention is to provide such derivatives of carboxylic acids (or the anhydrides, acid halides or esters thereof) and certain polyamine compounds in which the primary amine groups are blocked by ketimine groups. A further object of the invention is to provide novel polymers prepared from such derivatives and organic polyisocyanates or polyisothiocyanates. These and other objects will become apparent from the following detailed description of the invention.

We have now discovered novel derivatives of polyamine compounds having the primary amine groups blocked by ketimine groups and having at least one secondary amine group, said derivatives being prepared by reacting the said polyamines with a sufficient amount of a carboxylic acid compound to react with the secondary amine group or groups of said polyamine. Such derivatives are particularly useful for reaction with polyisocyanates or polyisothiocyanates to provide polymers of high utility. Our novel derivatives allow the tailoring of the properties of the polymers prepared therefrom through the appropriate selection of the carboxylic acid moiety introduced therein.

Any polyamine capable of reacting with an organic polyisocyanate and having at least one secondary amine group may be used in the preparation of the derivatives of the present invention. Preferred polyamines are the alkylene polyamines and the substituted alkylene polyamines. Especially preferred polyamines are selected from those having the following formula:

$$H_2N(RNH)_nRNH_2$$

where R is a difunctional aliphatic group containing from 2 to about 48 carbon atoms and n is an integer of 1 to about 20. R may represent the same or different radicals in any one polyamine compound. Where the polyamines contain two or more secondary amine groups, one or more of said groups may have the hydrogen replaced by an aliphatic group, i.e. methyl, propyl, butyl, decyl, hexadecyl, hexenyl, octenyl, tridecenyl, octadecyl, undecynyl and the like. Inert or non-interfering groups such as Cl, nitro and the like may be present on the group R or the described substituent replacing the hydrogen of one or more secondary amine groups. The polyamines must contain at least one free secondary amine group,

prior to the preparation of the derivatives of our invention.

Particularly preferred polyamines are those having the formula as set forth above wherein R is an aliphatic hydrocarbon group and n is an integer of 1 to 3. It is still more preferred that R is an alkylene group of 2–6 carbon atoms.

Typical of the amines which may be used are diethylene triamine, triethylene tetramine, etc., and the corresponding propylene, butylene, etc. amine.

The primary amine groups in the polyamine compounds are converted to ketimines by reaction with ketones. Such ketones may have the following structural formula:

wherein $R_1$ and $R_2$ are organic radicals and are each substantially inert to the ketimine formation reaction. Preferably $R_1$ and $R_2$ are short chain alkyl groups (1 to 4 carbon atoms). Preferred compounds are low molecular weight ketones that are volatile so that an unreacted excess thereof may easily be removed by conventional distillation practices when the reaction is completed. Such volatile compounds are also preferred so that when the derivatives of our invention are mixed with polyisocyanates and exposed to moisture, the freed ketone can be easily removed from the reaction mixture. It is often preferred to use a ketone which boils below or near the boiling point of water or which readily distills with water.

The reaction of the ketone with the primary amine groups can be illustrated as follows:

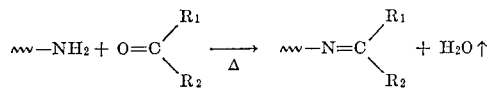

Preferred examples of ketones include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone, acetophenone, propiophenone, and the like. Especially preferred ketones are acetone, methyl ethyl ketone and methyl isobutyl ketone.

The derivatives of the present invention are prepared from the polyamine compounds having at least one free secondary amine group and having the primary amine groups thereof blocked with ketimine groups by reacting same with a carboxylic acid compound under amide forming conditions. Thus the free secondary amine groups are converted to amide groups.

Any mono, di or higher carboxylic acid can be used in the preparation of the derivatives of the invention. Such acids preferably contain from 1 to about 40 carbon atoms. Representative monocarboxylic acids are formic, acetic, lactic, propionic, butyric, benzoic valeric, caproic, enanthylic, caprylic, pelargonic, capric, undecylic, lauric, tridecoic, myristic, pentadecanoic, palmitic, margaric, stearic, nondecylic, arachidic, behenic, carnaubic, hyenic, carboceric, cerotic, lacceroic, melissic, montanic, psyllic, acrylic, crotonic, isocrotonic, vinylacetic, methacrylic, tiglic, angelic, senecioic, hexenic, teracrylic, hypogeic, oleic, elaidic, erucic, brassidic, sorbic, linoleic, linolenic, propiolic, tetrolic, pentinoic, amylpropiolic, palmitolic, stearolic, behenolic, cinnamic, and the like. Representative dicarboxylic and higher acids are adipic, citraconic, fumaric, glutaric, maleic, malic, malonic, oxalic, salicylic, succinic, tartaric, phthalic, sebacic, suberic, azelaic, terephthalic, pimelic, isophthalic, polymeric fat acids and the like. It is, of course, to be understood that in addition to the carboxylic acids referred to, other saturated or unsaturated carboxylic acids having straight or branched chains may be used, as well as acids having various substitutents such as Cl, nitro, hydroxyl, and the like. Also the corresponding acid chlorides, anhydrides and esters of the said carboxylic acids may be employed. Preferably the esters, if used, are prepared from alcohols containing less than about 8 carbon atoms—i.e. methyl, ethyl, propyl and the like.

One especially preferred group of carboxylic acids to be employed in preparing the derivatives of the present invention are the polymeric fat acids. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radicals" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervoni acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters— i.e., the methyl esters) derived from the naturally occurring drying and semidrying oils. Suitable drying and semi-drying oils include soybean, linseed, tall, tung, perilla, oiticica, cottonseed, corn, sunflower, dehydrated castor oil and the like. Also, the most readily available acids are oleic and linoleic and thus they are preferred starting materials for the preparation of the polymeric fat acids. Relatively pure dimerized fat acids can be obtained from mixtures containing monomer, the dimerized fat acids, trimerized fat acids and higher polymers by high vacuum distillation or solvent extraction. Any of the described unsaturated polymeric fat acids can be hydrogenated prior to the use thereof in the present invention.

The derivatives are prepared by heating a mixture of the ketimine blocked polyamine with the carboxylic acid compound to a temperature sufficiently high to form the amide linkage

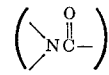

Thus, for example, when using a carboxylic acid, the mixture should preferably be heated to above 100° C. and more preferably to 120° C. and above. Temperatures of above about 300° C. should be avoided in most instances because of possible degradation of the resulting derivative. The reaction is also preferably carried out under conditions such that by-product water, HCl or alcohols formed during the reaction are removed from the reaction mixture—i.e. by distillation. And it is also preferred to carry out the reaction in the presence of a solvent. Such solvent should not react with either the carboxylic acid compound or the ketimine blocked polyamine. Hydrocarbon solvents such as benzene, toluene, xylene, cumene, ethylbenzene, heptane and the like are entirely suitable and preferred.

The carboxylic acid (or the anhydrides, acid chlorides or esters thereof) is used in an amount about equivalent to the equivalents of free secondary amine groups of the polyamine. In this respect, if the polyamine contains one free secondary amine group and the carboxylic acid is a monocarboxylic acid, one mole of the polyamine is reacted with one mole of the acid. If the polyamine contains two free secondary amine groups and the carboxylic acid is a monocarboxylic acid, one mole of the polyamine would be reacted with two moles of the monocarboxylic acid. If the polyamine has one free secondary amine group and the carboxylic acid is a dicarboxylic acid, two moles of the polyamine would be reacted with one mole of the dicarboxylic acid. It is thus apparent that the ratio of reactants varies as to the number of free secondary amine groups of the polyamine—i.e. one, two, three or more—and as to whether the carboxylic acid compound is mono, di, tri or higher. An excess of the ketimine blocked polyamine can be used in the formation of the derivative. After completion of the reaction, the said excess can be removed from the derivative such as by distillation.

The derivatives of our invention are complex materials. In this respect they comprise a residue of a polyamine, 2 or more (preferably less than about 50) ketimine blocked primary amine groups and 1 or more (preferably less than about 50) amide groups derived from the secondary amine group or groups of the polyamine and carboxylic acid compounds. In some of the preferred and simpler aspects, the derivatives can be defined structurally. Thus when the polyamine has only one free secondary amine group and the carboxylic acid compound is mono- or di-functional or when the polyamine has more than one free secondary amine group and the carboxylic acid compound is monofunctional, the derivatives can be defined by the following idealized, structural formulae:

I.

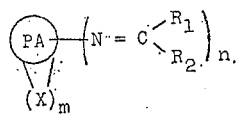

and

II.

where $R_1$ and $R_2$ are as defined above, $n$ is an integer of at least 2, $m$ is an integer of at least 1,

is the residue of a polyamine exclusive of the ketimine blocked primary amine groups and the amide linked secondary amine nitrogen, $>X$ is

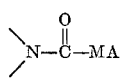

where MA is the residue of a monocarboxylic acid, and $>Y<$ is

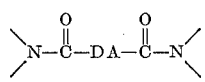

where DA is the residue of a dicarboxylic acid. Where the polyamine contains two or more secondary amine groups and the carboxylic acid compound is di, tri or higher functional, complex mixtures of derivatives tend to be produced. Such mixtures include polymers where three or more polyamine moieties are linked by three or more amide moieties. The derivatives of our invention also include mixtures wherein two or more different polyamines are employed and/or two or more different carboxylic acid compounds are employed.

The following examples illustrate the preparation of certain preferred derivatives and are not to be considered as limiting.

EXAMPLE A

A mixture of 146 g. (1.0 mole) adipic acid, 700 g. xylene and 540 g. (2.02 moles) of the diketimine made from diethylenetriamine and methyl isobutyl ketone was heated at reflux under a nitrogen atmosphere in a 2000 ml. round bottom flask equipped with a stirrer, reflux condenser and Barrett trap. The reaction mixture was refluxed for 20 hours during which time 41 ml. of water was removed by azeotropic distillation. At the end of the said reaction period (no more water being formed), the liquid portion of the reaction mixture was separated and stripped of solvent by heating under vacuum leaving 465 g. of residue. Unreacted diketimine was distilled from the residue to a pot temperature of 196° C. (at 0.7 mm. Hg) leaving 184 g. of derivative. The derivative had an amine number of 384 and its infrared spectrum taken in carbon tetrachloride showed bands at 6.0 and 6.16 microns characteristic of ketimines and disubstituted amides, respectively. The derivative had the following structure:

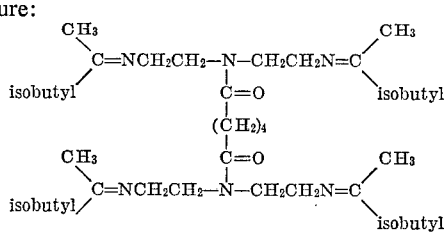

EXAMPLE B

Example A was essentially repeated except that 267 g. (1.0 mole) of the diketimine, 500 g. xylene and 282 g. (.5 mole) of hydrogenated, distilled dimerized fat acid (percent dimer—93.5, percent monomer—5.5, percent trimer—1.0; acid number—192.9; iodine value—18.6) were employed. The dimerized fat acid was prepared by polymerizing the mixture of fat acids derived from tall oil and consisted mainly of a mixture of dimerized linoleic and oleic acids. The resulting product had an amine number of 254 and its infrared spectrum showed bands corresponding to ketimine and disubstituted amide. The product consisted mainly of the derivative having the following structure:

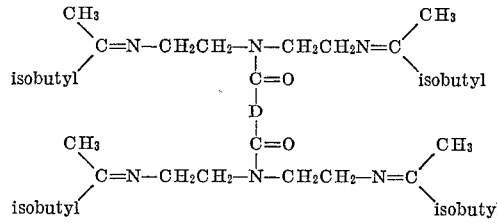

where D is the divalent hydrocarbon radical of the starting hydrogenated dimerized fat acid.

EXAMPLE C

In a 2000 ml., three-neck flask equipped with magnetic stirrer, thermometer, nitrogen purge and reflux condenser with a Barrett trap was placed 282 g. (0.5 mole) hydrogenated, distilled dimerized fat acid (as used in Example B), 534 g. (2.0 moles) diketimine (as used in Examples A and B), and 500 ml. xylene. The mixture was heated at reflux (145° C.) for 10 hours as water was distilled off. After the azeotropic distillation of water was completed, xylene was distilled off under reduced pressure. Finally, unreacted diketimine was distilled off up to a reaction temperature of 198° C. (at 1 mm. Hg). There was obtained 491 g. of derivative which was a viscous liquid. Its infrared spectrum showed bands corresponding to disubstituted amide and ketimine. The derivative had the same structure as the derivative of Example B.

EXAMPLE D

In a 2000 ml. flask as used in Example C was placed 451.5 g. (2.14 moles) of the diketimine made from diethylene-triamine and methyl ethyl ketone, 305.0 g. (0.54 mole) of hydrogenated, distilled dimerized fat acid (as used in Example B) and 500 ml. xylene. The mixture was heated at reflux (141–147° C.) for 6 hours as water was distilled off. After the azeotropic distillation of water was completed, xylene was distilled off until the reaction temperature reached 165° C. Finally, a vacuum was applied and residual xylene and excess diketimine were distilled off. There was obtained 460 g. of derivative having an amine number of 238. Infrared analysis showed bands corresponding to ketimine and disubstituted amide absorption. The derivative had the following structure:

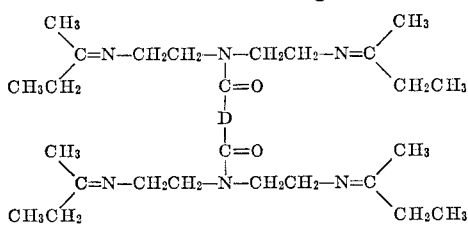

where D is the divalent hydrocarbon radical of the starting dimerized fat acid.

EXAMPLE E

A mixture of 148 g. (0.5 mole) of the diketimine made from di-(3-aminopropyl)amine and methyl isobutyl ketone, 141 g. (0.25 mole) of hydrogenated, distilled dimerized fat acid (as used in Example B) and 50 ml. xylene was charged to a 500 ml. round bottom flask equipped with thermometer, reflux condenser, Barrett trap and magnetic stirrer. The reaction mixture was refluxed for 7½ hours while removing water formed in the reaction. After completion of the reaction, the reaction product was stripped of xylene by heating at reduced pressure. There was obtained 265 g. of derivative having an amine number of 195. The derivative had the following structure:

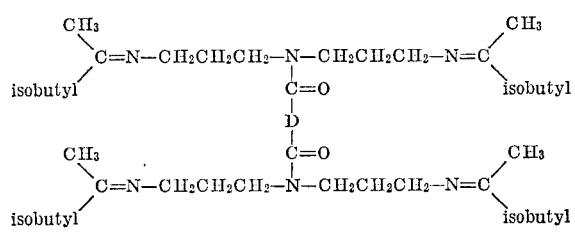

where D is the divalent hydrocarbon radical of the starting dimerized fat acid.

EXAMPLE F

A mixture of 588 g. (2.2 moles) diketimine (as used in Example A), 564.0 g. (1.0 mole) hydrogenated, distilled dimerized fat acid (as used in Example B), and 1000 g. xylene was charged to a 3000 ml. three necked, round bottom flask equipped with a nitrogen inlet, reflux condenser, Barrett trap and thermometer. The reaction mixture was refluxed at 140–145° C. for six hours during which period 64 g. water was removed by distillation. After the said reaction period (no more water being formed), excess xylene was stripped from the reaction product under vacuum. There was obtained 1007 g. of derivative having an amine number of 274.6. The derivative had the following structure:

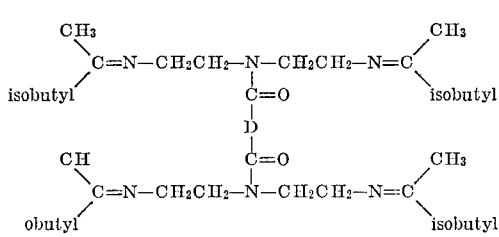

where D is the divalent hydrocarbon radical of the starting dimerized fat acid.

As indicated above, the derivatives of the present invention are particularly useful for preparing polymers by reaction with organic polyisocyanates or polyisothiocyanates and such polymers also form a part of our invention.

Typical polyisocyanates which may be used in preparing the polymers of the present invention include the polymethylene diisocyanates such as ethylene diisocyanate, trimethylene diisocyanate, tetramethylene diisocyanate, pentamethylene diisocyanate, hexamethylene diisocyanate, etc.; other alkylene diisocyanates, such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanato bis(cyclohexyl)methane, etc.; cycloalkylidene diisocyanates, such as cyclopentylidene diisocyanate, cyclohexylidene diisocyanate, etc.; triisocyanates such as 1,2,4-butanetriisocyanate, 1,3,3-pentanetriisocyanate, 1,2,2-butanetriisocyanate, etc.

Examples of useful araliphatic polyisocyanates which may be used in the present invention include the following: p-phenylene-2,2'-bis(ethyl isocyanate), p-phenylene-3,3'-bis(propyl isocyanate), p-phenylene-4,4'-bis(butyl isocyanate), m-phenylene-2,2'-bis(ethyl isocyanate), 1,4-naphthalene-2,2'-bis(ethyl isocyanate), 4,4'-diphenylene-2,2'-bis(ethyl isocyanate), 4,4'-diphenylene ether-2,2-bis (ethyl isocyanate), tris(2,2',2''-isocyanatoethyl)benzene, 5-chlorophenylene - 1,3 - bis(propyl-3 isocyanate), 5-methoxyphenylene - 1,3 - bis(propyl-3 isocyanate), 5-cyanophenylene - 1,3 - bis(propyl-3 isocyanate) and 5-methylphenylene-1,3-bis(propyl-3 isocyanate).

Typical aromatic polyisocyanates which may be used include tolylene diisocyanate, m-phenylene diisocyanate, naphthalene - 1,4 - diisocyanate, diphenylene-4,4'-diisocyanate, etc.; aliphatic-aromatic diisocyanates, such as xylylene-1,4-diisocyanate, xylylene-1,3-diisocyanate, 4,4'-diphenylenemethane diisocyanate, etc.

The corresponding polyisothiocyanates may also be used. Preferred reactants in the preparation of our polymers are the aliphatic, cycloaliphatic and araliphatic polyisocyanates. An especially preferred group of polyisocyanates to be employed in the present invention are those derived from polymeric fat acids. Such polyisocyanates have the following idealized, structural formula:

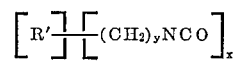

where $y$ is 0 or 1, $x$ is an integer of 2 to about 4 and R' is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

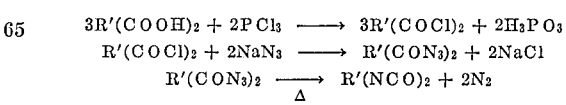

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

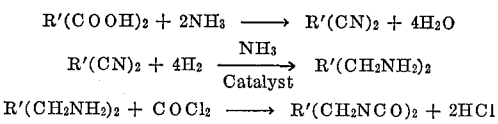

The polymeric fat acids useful in preparing such preferred polyisocyanates are as described hereinabove.

The said polyisocyanates or polyisothiocyanates may be used in preparing the polymers in the form of the free isocyanate or they may be used in the form of so-called prepolymers. These prepolymers are generally reaction products of polyols or polyester polyols with the polyisocyanates or polyisothiocyanates such that essentially 1 mole of the latter is reacted with each equivalent of hydroxyl group, the product thus being an isocyanate terminated prepolymer. It is to be thus understood that the terms "polyisocyanate" or "polyisothiocyanate" are intended to include prepolymers of simple polyols, polyether polyols, and polyester polyols. Typical polyols include trimethylolpropane, 1,4,6-hexanetriol, glycerol, ethylene glycol, diethylene glycol, 1,4-butanediol, 1,4-butenediol, 1,3-butanediol and the like. The polyether polyols are hydroxy terminated homopolymers and copolymers of ethylene oxide, propyleneoxide, butylene polymers of ethylene oxide, propylene oxide, butylene terminated polymers which may be derived from the above polyols and any of the typical polybasic acids used in polyester preparations.

The polymers of our invention are prepared by simply admixing the ketimine-amide derivatives with the organic polyisocyanates or polyisothiocyanates and exposing the reaction mixture to water—i.e. moisture from the atmosphere. The reaction can be carried out in the presence of a diluent or solvent and, if desirable, the reaction mixture can be heated or cooled to control the rate of reaction. When coatings, films or the like are to be prepared from the compositions, it may be desirable to include fillers or pigments and the like. Representative of such materials are amorphous silicas, titanium dioxide, carbon black, chrome yellow, phthalocyanine blue and green, toluidine red, quinacridone red, green gold, toluidine yellow, iron oxide red and fire orange red. The amounts of the derivative and the polyisocyanate used in preparing the polymers can be varied over wide limits. Preferably the derivative and polyisocyanate are used in an equivalent ratio of about 2:1 to 1:2 based on the ketimine blocked primary amine groups and the free isocyanato groups.

The following examples serve to illustrate the preparation of certain preferred polymers and are not to be considered as limiting. All parts are by weight unless otherwise indicated.

EXAMPLE I

A mixture of 16.1 parts of the ketimine-amide derivative of Example A (.10 equivalent), 30 parts dimeryl isocyanate (.10 equivalent) and 46.1 parts mineral spirits (an aliphatic hydrocarbon liquid petroleum fraction boiling from about 310° F. to 390° F.) was used to coat tin and glass panels (3 mil coating). The dimeryl isocyanate had the theoretical structural formula:

$$D(CH_2NCO)_2$$

where D is the dimeric fat acid radical and in this case was derived from the mixture of dimerized fact acids obtained from the fat acids derived from tall oil consisting mainly of a mixture of dimerized linoleic and oleic acids. The coating was exposed to ambient room conditions (70° F. and 50% relative humidity). It became tack-free overnight. After seven days, the polyurea coatings had a pencil hardness of <6B (on glass), a Sward rocker hardness of 3% (on glass) and an extensibility (on tinplate) of over 60% (G.E. tester).

EXAMPLE II

A mixture of 13.3 parts of the ketimine-amide derivative of Example B (0.05 equivalent), 15 parts dimeryl isocyanate (as used in Example I) and 12.4 parts mineral spirits was used to coat various substrates (3 mil coatings). The coatings were exposed to ambient room conditions (50% relative humidity and 70° F.) and under such condition became tack-free overnight. After 14 days, coatings on glass had a pencil hardness of 6B and a Sward rocker hardness of 7% and the coating on tinplate had a G.E. extensibility of over 60%. The coatings also exhibited good dry adhesion to black plate steel, cold rolled steel, polished cold rolled steel, aluminum and granodized steel.

EXAMPLE III

Example I was repeated using a coating mixture consisting of 6.4 parts of the ketimine-amide derivative of Example C (0.024 equivalent), 7.5 parts dimeryl isocyanate (as used in Example I) and 13.9 parts mineral spirits. The resulting coatings (3 mil) became tack-free overnight and after 14 days had a pencil hardness of <6B (glass substrate), a Sward rocker hardness of 6% (glass substrate) and a G.E. extensibility of greater than 60% (tinplate substrate).

EXAMPLE IV

Example III was repeated using a coating mixture consisting of 5.9 parts of the ketimine-amide derivative of Example D (0.025 equivalent), 7.5 parts dimeryl isocyanate (as used in Example I) and 13.4 parts mineral spirits. The resulting coatings had the same fine properties as those of Example III.

EXAMPLE V

Example III was repeated using a coating mixture consisting of 5.3 parts of the ketimine-amide derivative of Example B (0.02 equivalent), 6.0 parts dimeryl isocyanate (as used in Example I) and 11.3 parts mineral spirits. The coatings on glass and tinplate (3 mil) became tack-free overnight. The extensibility of the coatings (as measured on the tinplate substrate) was high—i.e. over 60% after 7 days. The coating on the glass had a Sward rocker hardness of 3%, 5% and 6% after 1, 7 and 14 days, respectively.

EXAMPLE IV

A mixture of 133 parts of the ketimine-amide derivative of Example B (0.5 equivalent) and 150 parts dimeryl isocyanate (as used in Example I) was placed in a container and degassed by vacuum. The mixture gelled overnight (held at 70° F. and 50% relative humidity) forming a clear elastomeric solid which had a Shore A hardness of 55.

As shown by the examples above, the polymers prepared from certain of the derivatives of the invention have high utility as coatings for a variety of substrates. The properties of the polymers can, of course, be varied by the choice of polyamine, carboxylic acid compound and polyisocyanate or polyisothiocyanate employed. The polymers also find use in the preparation of molded articles, as adhesive and the like.

The embodiments of the invention in which an exclusive property or privilege is claimed are defined as follows:

1. As a composition of matter, a derivative having the structural formula:

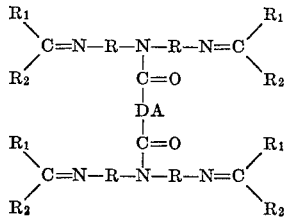

wherein R is an alkylene group of 2 to 6 carbon atoms, $R_1$ and $R_2$ are alkyl radicals of 1 to 4 carbon atoms and DA is a divalent hydrocarbon radical of 2 to 38 carbon atoms.

2. A derivative having the structure:

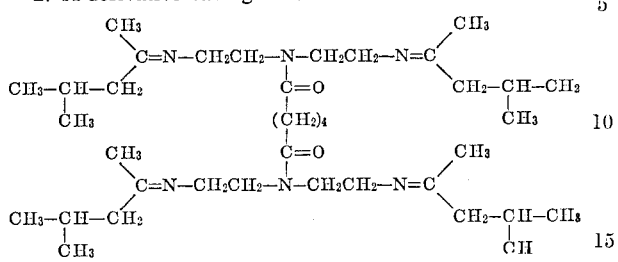

3. A derivative having the structure:

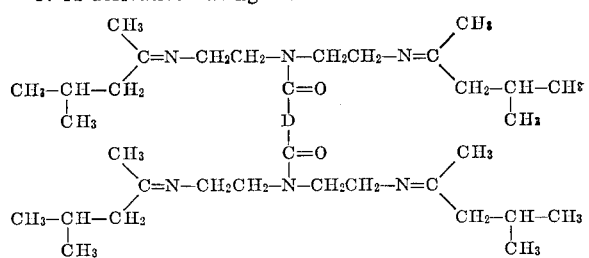

where D is the saturated divalent hydrocarbon radical of a mixture of dimerized linoleic and oleic acids.

4. A derivative having the structure:

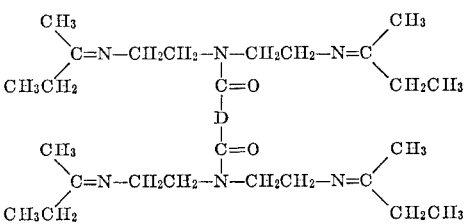

where D is the saturated divalent hydrocarbon radical of a mixture of dimerized linoleic and oleic acids.

5. A derivative having the structure:

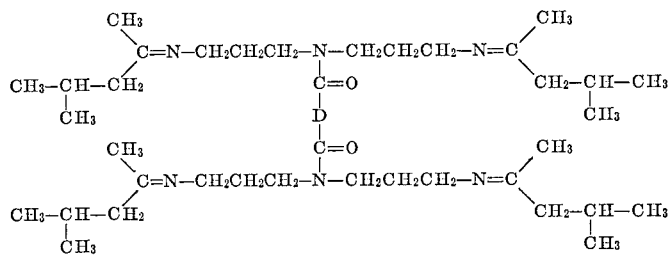

where D is the saturated divalent hydrocarbon radical of a mixture of dimerized linoleic and oleic acids.

References Cited

UNITED STATES PATENTS 3,401,146  9/1968  Kamal et al. _____ 260—47

ALEX MAZEL, Primary Examiner

J. A. NARCAVAGE, Assistant Examiner

U.S. Cl. X.R.

117—128.4, 161; 260—37, 77.5, 407, 558, 561

PO-1050
(5/69)

UNITED STATES PATENT OFFICE
CERTIFICATE OF CORRECTION

Patent No. 3,535,353        Dated  October 20, 1970

Inventor(s)  Marwan R. Kamal, John R. Nazy, Harold A. Wittcoff

It is certified that error appears in the above-identified patent and that said Letters Patent are hereby corrected as shown below:

Column 1, line 39, "foamed" should read -- formed --. Column 3, line 62, "radicals" should read -- radical --. Column 4, line 15, "nervoni" should read -- nervonic --. Column 9, line 28, delete "polymers of ethylene oxide, propylene oxide, butylene" and insert therefor -- oxide, and the like. The polyester polyols are hydroxyl --. Column 10, line 46, "EXAMPLE IV" should read -- EXAMPLE VI --. Column 11, lines 14-16, the lower right-hand portion of the formula reading

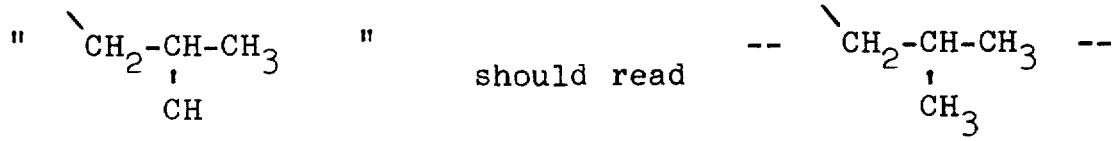

Signed and sealed this 13th day of April 1971.

(SEAL)
Attest:

EDWARD M. FLETCHER, JR.
Attesting Officer

WILLIAM E. SCHUYLER, JR.
Commissioner of Patents